United States Patent Office 3,655,782
Patented Apr. 11, 1972

3,655,782
DIALKYLATION OF HALOADAMANTANES
Robert E. Moore, Wilmington, Del., assignor to Sun Oil Company, Philadelphia, Pa.
No Drawing. Filed Aug. 30, 1968, Ser. No. 756,431
Int. Cl. C07c 1/26, 17/00, 23/38
U.S. Cl. 260—648 R
19 Claims

ABSTRACT OF THE DISCLOSURE

Dialkylated adamantane hydrocarbons can be prepared in high yields with an $AlBr_3$ or $AlCl_3$ catalyst and ethylene in a highly branched hydrocarbon solvent. The use of a solvent containing tertiary hydrogen atoms is contraindicated by the prior art because of the possibility of the solvent competing in the alkylations.

This invention relates to the dialkylation of haloadamantanes. More particularly monohalo, specifically bromo- and chloro-adamantanes having 10 to 30 carbon atoms including adamantane per se and substituted adamantanes such as alkyl, cycloalkyl and aryl-adamantanes are converted to adamantanes having 2 ethyl substitutes at bridgehead positions more than the starting material.

Adamantane tricyclo [$3.3.1.1^{3,7}$] decane) has a carbon structure containing ten carbon atoms arranged in a completely symmetrical, strainless manner, a cage-like structure which consists of three condensed cyclohexane rings. There are four bridgehead carbon atoms which are equivalent to each other as are the rings. The adamantane structure is often depicted by:

The preparation of methyl- and/or ethyl-substituted adamantanes by the isomerization of tricyclic naphthenes by means of an aluminum halide or HF-BF catalyst has been described in several references including the following: Schneider, United States Pat. No. 3,128,316; Janoski et al., United States Pat. No. 3,275,500; Schleyer et al., Tetrahedron Letters No. 9, pp. 305–309 (1961); and Schneider et al., JACS, vol. 86, pp. 5365–5367 (1964). The isomerization products can have the methyl and/or ethyl groups attached to the adamantane nucleus at either bridgehead or non-bridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes and trimethyladamantanes.

Preparation of adamantane hydrocarbons having higher alkyl groups has been disclosed by Spengler et al., Erdöl und Kohle-Erdgas-Petrochemie, vol. 15, pp. 702–707 (1962). These authors used a Wurtz synthesis involving the reaction of 1-bromoadamantane with alkali metal alkyls to interchange the alkyl group for the bromine substituent. In this manner 1-n-butyladamantane and 1-n-hexyladamantane were prepared.

Hoek et al., 85 (1966) Recueil 1045–1053, have described a different route for the preparation of butyl-substituted adamantane. A rather complicated procedure was developed, which involved reacting bromo-adamantane with thiophene using $SnCl_4$ as catalyst in the presence of excess thiophene as solvent to produce adamantylthiophene and then hydrogenating the adamantylthiophene to yield butyl-substituted adamantanes.

Recently, Schneider disclosed in U.S. Pat. No. 3,382,-288, a process for alkylating adamantane hydrocarbons with olefins or alcohols and a concentrated $H_2SO_4$ or HF catalyst. Although polyalkylation is possible it is stated to be less facile.

Stetter and Goebel, in Ber. 95, 1039–1042 (1962) disclosed a process for preparing 1-bromo-2-[adamantyl-(1)] ethane (57% of theoretical) wherein gaseous ethylene is contacted with 1-bromoadamantane in the presence of $AlBr_3$ in hexane solvent.

It has now been found that a dialkylated product can be obtained from ethylene and $AlCl_3$ or $AlBr_3$ catalyst and a particular class of solvents. Briefly stated the present invention is a process for the dialkylation of an adamantane compound having a monohalo bridgehead substituent and at least one unsubstituted bridgehead carbon atom comprising contacting said adamantane compound with ethylene in the presence of a catalytic amount of $AlCl_3$ or $AlBr_3$ at an alkylating temperature in the range of −50 to 30° C. in a solvent having tertiary hydrogen and recovering a dialkylated adamantane product having 2 more bridgehead alkyl substituents than the starting material.

As pointed out above, Stetter and Goebel carried out a very similar reaction but used a solvent that contained no tetriary hydrogen atoms. Normally the solvent employed would be one that contained no tertiary hydrogen atoms. The basis for this is the generally accepted mechanism for this reaction which is believed to through a carbonium ion. This can be shown in an over simplified form for Stetter and Goebel's reaction as:

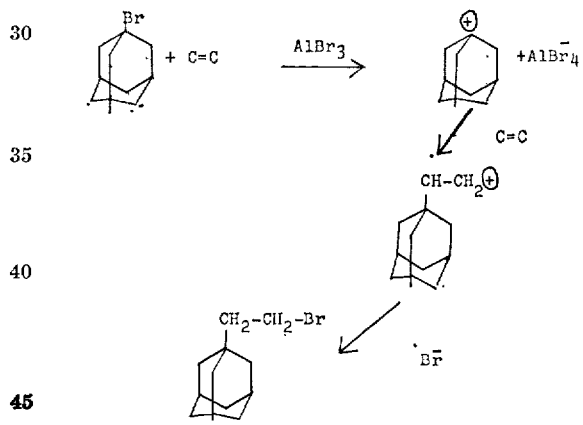

The reported yield was 57% of theoretical. Thus, the reaction is seen to proceed through the reactive tertiary halide atom and it would be indicated that any other reactive tertiary atoms such as tertiary hydrogen be excluded from the reaction.

It has been found that using essentially the same reaction components and conditions as employed by Stetter and Goebel, but carried out in a highly branched hydrocarbon solvent having tertiary hydrogen atoms, such as petroleum ether boiling in the range of about 30–65° C. produces high yields of one major product which is the 1,3-diethyl substituted adamantane.

In addition to 30–65° C. petroleum ether any $C_4$–$C_6$ hydrocarbon or mixtures thereof having tertiary hydrogen atoms can be used in the present process. Generally such highly branched saturated hydrocarbons or mixtures thereof of boil in the range of −15 to +100° C. For example, these include isobutane, isopentane, methylpentane, methylcyclopentane and the like.

The adamantane starting material for the present process is a bridgehead bromo- or chloro-adamantane having 10–30 carbon atoms, 0 to 2 bridgehead hydrocarbon radicals and 0–6 nonbridgehead hydrocarbon radicals, each radical having 1–10 carbon atoms, selected from the group consisting of alkyl, cycloalkyl and aryl. These radicals can contain branched chains, however, tertiary hydrogen atoms are not desirable in the hydrocarbon substituent since they would compete in the reaction and, thus, reduce the yield of desirable dialkylated product and contribute to a more complex reaction product. Thus, adamantanes having 0–2 bridgehead hydrocarbon radicals selected from the group consisting of straight chain alkyl and phenyl are preferred.

Particularly preferred starting materials are the bridgehead bromo- or chloro- of adamantane, methyladamantane, ethyladamantane, ethylmethyladamantane, dimethyl adamantane and diethyladamantane.

The alkylating agent in the present invention is ethylene. The ethylene is added in gaseous form in large excess. In terms of molar quantities this can be broadly stated as the mole ratio of ethylene to adamantane compound being in the range of 2:1 to 100:1.

The reaction proceeds in the presence of either of two particular Lewis acids, i.e., $AlBr_3$ or $AlCl_3$. In practice the catalyst should correspond to the halogen substituent on the adamantane. A catalytic amount of the material is employed, generally this will be in the range of 0.5 to 10 wt. percent of the total reactants. $AlBr_3$ catalyzed reactions generally proceed at lower temperatures in the range of $-50$ to $0°$ C. whereas $AlCl_3$ catalyzed reactions proceed best at somewhat higher temperatures in the range of $-25$ to $30°$ C.

In carrying out the process of the invention, the haloadamantane compound is dissolved in the tertiary hydrogen containing solvent. This can then be added to the catalyst in a suitable reactor or the catalyst can be added to the solution. Preferably the combination of catalyst with solvent and adamantane compound is done in the absence of air, for example, under a nitrogen atmosphere. The gaseous ethylene is introduced through an inlet below the surface of the solution. Vigorous agitation of the solution is preferred in order to thoroughly disperse the ethylene.

After the reaction was completed, the catalyst was killed, for example, by pouring the reaction mixture into water. The water-reaction mixture was extracted with a suitable solvent, such as, petroleum ether, and the solvent evaporated.

The following examples are present to illustrate the invention.

EXAMPLE I $AlBr_3$ (5.0 g.) was added to a dried 100 ml., 3 necked flask equipped with a condenser leading to a drying tube. 1-bromo-3,5-dimethyladamantane (15.0 g.) and 45 cc. of petroleum ether (B.R. 30–60° C.) were added to the flask under a nitrogen atmosphere. The reactants and flask were cooled to $-30°$ C. and ethylene added via a hypodermic needle through a serum cap to the stirred heterogeneous mixture. The reaction mixture was treated with ethylene for 1.5 hours; poured into an ice/water petroleum-ether mixture. The resulting mixture was extracted with additional petroleum ether; the ether extracts combined, dried and evaporated. The product was a reddish amber liquid. Vapor phase chromatography and infrared spectra showed the major product (85% of theoretical) to be 1,3-diethyl-5,7-dimethyladamantane.

EXAMPLES 2–6

Examples 2–6 were carried out as Example 1, but the solvent was n-hexane and the reaction times are as indicated in Table I.

TABLE I

| Example | Reaction time, min. | 1,3-diethyl-5,7-dimethyl-adamantane, wt. percent | 1-bromo-2-[adamantyl-(1)]ethane, wt. percent |
|---|---|---|---|
| 2 | 10 | Trace | 53.8 |
| 3 | 15 | Trace | 64.6 |
| 4 | 45 | Trace | 75.4 |
| 5 | 60 | 0.3 | 75.0 |
| 6 | 120 | 3.0 | 36.4 |

It can be seen that the quantity of 1,3-diethyl-5,7-dimethyladamantane at 2 hours is insignificant in the absence of the tertiary hydrogen containing solvents of the invention.

The products of the present process wherein there are unsubstituted bridgehead carbons available provide starting materials from which various functional derivatives can be prepared, such as, monools, diols, mono and diacids, amines, isocyanates or haloadamantanes. Such derivatives can be employed for preparing various kinds of useful products such as special lubricants, solid polymers, pharmaceuticals and pesticides. For examples, Duling and Schneider application, U.S. Pat. No. 3,398,165, describes special ester-type lubricants having unusually good thermal stability made from alkyladamantane monools and aliphatic diacids or diacid chlorides or from alkyladamantane diols and aliphatic diacids or diacid chlorides or from alkyladamantane diols and aliphatic monoacids or monoacid chlorides. Likewise, solid polymers containing adamantane nuclei, such as the polyurethanes described in application U.S. Ser. No. 525,290, filed Feb. 7, 1966, now abandoned, or polyamides as described in application U.S. Ser. No. 542,229, filed Apr. 13, 1966, now abandoned, can be made by the present monomers.

The dialkylated products of the invention that have 3 or 4 hydrocarbon bridgehead substituents have particular utility as fuels or fuel components for jet aircraft and rockets. The products are normally liquids and can be used alone as fuel or can be admixed with other fuels such as naphtha, kerosene, light gas oil, in which they have good solubility. These materials will be particularly useful in MACH 3 applications since they have densities approaching 1; low volatility; and high heats of combustion.

The invention claimed is:

1. A process for the dialkylation of an adamantane compound having a monohalobridgehead substituent selected from the group consisting of bromo and chloro and at least one unsubstituted bridgehead carbon atom comprising contacting said adamantane compound with ethylene in the presence of a catalytic amount of $AlCl_3$ or $AlBr_3$ at an alkylating temperature in the range of $-50$ to $30°$ in a highly branched saturated hydrocarbon solvent boiling in the range of $-15$ to $+100°$ C. having tertiary hydrogen and recovering an adamantane product having two or more bridgehead ethyl substituents than the starting material.

2. The process according to claim 1 wherein the solvent is selected from the group consisting of 30–65° C. petroleum ether, $C_4$–$C_6$ hydrocarbons and mixtures thereof.

3. The process according to claim 2 wherein the catalyst is $AlBr_3$.

4. The process according to claim 3 wherein the temperature is in the range of $-50$ to $0°$ C.

5. The process according to claim 4 wherein the adamantane compound is a bromoadamantane having 10–30 carbons, 0 to 2 bridgehead hydrocarbon radicals, 0–6 non-bridgehead hydrocarbon radicals, said radicals selected from the group consisting of alkyl, cycloalkyl and aryl, each of said radicals having 1–10 carbon atoms.

6. The process according to claim 5 wherein the adamantane compound has 0 to 2 bridgehead hydrocarbon radicals selected from the group consisting of straight chain alkyl and phenyl.

7. The process according to claim 5 wherein the catalyst is present in the range of 0.5 to 10 wt. percent of total reactants.

8. The process according to claim 5 wherein the mole ratio of ethylene to adamantane compound is in the range of 2:1 to 100:1.

9. The process according to claim 6 wherein the adamantane compound is 1-bromo-3,5-dimethyladamantane.

10. The process according to claim 6 wherein the adamantane compound is 1-bromoadamantane.

11. The process according to claim 9 wherein the solvent is petroleum ether.

12. The process according to claim 2 wherein the catalyst is AlCl$_3$.

13. The process according to claim 12 wherein the temperature is in the range of −25 to 30° C.

14. The process according to claim 13 wherein the adamantane compound is a bromoadamantane having 10–30 carbon, 0 to 2 bridgehead hydrocarbon radicals, 0–6 nonbridgehead hydrocarbon radicals, said radicals selected from the group consisting of alkyl, cycloalkyl and aryl each of said radicals having 1–10 carbon atoms.

15. The process according to claim 14 wherein the adamantane compound has 0 to 2 bridgehead hydrocarbon radicals selected from the group consisting of straight chain alkyl and phenyl.

16. The process according to claim 14 wherein the catalyst is present in the range of 0.5 to 10 wt. percent of total reactants.

17. The process according to claim 14 wherein the mole ratio of ethylene to adamantane compound is in the range of 2:1 to 100:1.

18. The process according to claim 15 wherein the adamantane compound is 1-chloro-3,5-dimethyladamantane.

19. The process according to claim 15 wherein the adamantane compound is 1-chloroadamantane.

References Cited

Stetter, Ber. Deut. Chem. 95, 1039–1042 (1962).

DANIEL D. HORWITZ, Primary Examiner

U.S. Cl. X.R.

260—649 R; 44—80, 50; 149—109; 260—666 M